United States Patent [19]

Callahan et al.

[11] Patent Number: 4,982,345

[45] Date of Patent: Jan. 1, 1991

[54] INTERACTIVE COMPUTER GRAPHICS DISPLAY SYSTEM PROCESSING METHOD FOR IDENTIFYING AN OPERATOR SELECTED DISPLAYED OBJECT

[75] Inventors: Robert M. Callahan, Woodstock; Bob C. Liang, West Hurley, both of N.Y.

[73] Assignee: International Business Machines Corporation, Armonk, N.Y.

[21] Appl. No.: 299,901

[22] Filed: Jan. 23, 1989

[51] Int. Cl.[5] .......................................... G06F 15/626
[52] U.S. Cl. .................................. 364/521; 340/747; 364/518
[58] Field of Search ....................... 364/518, 521, 522; 340/721, 723, 724, 725, 726, 727, 728, 729, 747; 382/44, 45, 46, 47, 48

[56] References Cited

U.S. PATENT DOCUMENTS

| | | | |
|---|---|---|---|
| 3,589,289 | 6/1971 | Gosnell et al. | 101/401.1 |
| 3,715,744 | 2/1973 | Ito et al. | 340/336 |
| 3,725,563 | 4/1973 | Woycechowsky | 35/10.2 |
| 3,885,097 | 5/1975 | Pobgee | 178/18 |
| 4,112,422 | 9/1978 | Mayer et al. | 340/324 |
| 4,371,893 | 2/1983 | Rabeisen | 358/93 |
| 4,412,296 | 10/1983 | Taylor | 340/729 X |
| 4,451,895 | 5/1984 | Sliwkowski | 364/521 |
| 4,507,523 | 3/1985 | Gohara et al. | 178/19 |
| 4,779,081 | 10/1988 | Nakayama et al. | 340/747 X |
| 4,805,117 | 2/1989 | Fiore et al. | 364/521 X |
| 4,811,241 | 3/1989 | Liang | 340/747 X |
| 4,821,209 | 4/1989 | Hempel et al. | 340/747 X |

OTHER PUBLICATIONS

Foley et al., *Fundamentals of Interactive Computer Graphics*, pp. 433–461, 1983.

IBM Technical Disclosure Bulletin, vol. 28, No. 8, Jan. 1986, p. 3252.

*Primary Examiner*—Gary V. Harkcom
*Assistant Examiner*—H. R. Herndon
*Attorney, Agent, or Firm*—Michael J. Scheer; John D. Crane; Mark S. Walker

[57] ABSTRACT

An interactive computer graphics display system processing method for identifying a displayed primitive that intersects an operator selected area of the display screen. Pursuant to the method, the operator selected area of the display screen is reverse mapped to world coordinate space; data representative of displayed geometric primitives is then clipped against the reverse mapped selected area in world coordinate space; and clipped data representative of displayed geometric primitives that intersect the reverse mapped selected area are identified for operator defined application processing. Further processing steps include mapping of the identified data to screen coordinate space and rasterization of the data for display in the screen monitor. A zoom processing method is also provided wherein an original operator defined zoom window is transformed from screen coordinate space to world coordinate space and the boundaries of the transformed window in world coordinate space are utilized as data clipping boundaries. After clipping, data representative of a displayed geometric primitive outside the inverse mapped zoom window is discarded, thus preventing the rerasterization of geometric primitives outside the zoom window. Further processing includes mapping of the identified data to a defined zoom window in screen coordinate space for operator viewing and selection of a particular geometric primitive for application processing.

11 Claims, 6 Drawing Sheets

INTERACTIVE COMPUTER GRAPHICS DISPLAY SYSTEM PROCESSING METHOD FOR IDENTIFYING AN OPERATOR SELECTED DISPLAYED OBJECT

BACKGROUND OF THE INVENTION

1. Technical Field

This invention relates in general to computer graphics display systems, and more particularly, to a processing method for identifying a displayed object that intersects an operator selected area of the display screen and for enlarging a selected area of the display screen to facilitate operator selection of an object when a complex display is presented.

2. Description of the Prior Art

Interactive raster graphics systems, such as CAD/CAM (Computer Aided Design/Computer Aided Manufacture) workstations, are widely used to design components and systems of mechanical, electrical, electromechanical and electronics devices. Frequently, the emphasis within such systems is on an operators interacting with a computer based model of a component or system being designed in order to test, for example, its mechanical, electrical or thermal properties. The computer based model is comprised of numerous graphics objects that are individually processed and displayed for operator action. Selection of a displayed object is accomplished via any one of a number of operator controlled interaction devices, such as light pens, locators (e.g., a data tablet with stylus), and alphanumeric and function keyboards. An important part of many interaction sequences is computer identification of an operator selected displayed object to be operated upon, a process which is complicated by the pipeline processing techniques utilized within most graphics systems today.

Typically, graphics system processing techniques require the reprocessing of an entire display screen to identify a particular displayed object selected or picked for further processing. More particularly, existing processing methods require the reexecution of the whole display program, including: transformation of each geometric primitive defining a displayed object in world coordinate space; clipping of each transformed primitive against the predefined clipping boundary in world coordinate space; mapping of each clipped primitive to an operator defined viewport in screen coordinate space; rasterization of all mapped data; and finally, determination of whether the generated pixels intersect the operator defined selection area or window in screen coordinate space. If so, then a pick occurs.

Although effective, a clear drawback to this procedure is the unnecessary processing occuring as the result of mapping and rasterizing geometric objects not selected. For example, rasterization of a filled polygon outside the operator selected screen area is both unnecessary and time consuming. A similar processing technique is also disadvantageously used in most graphics systems to enlarge or "zoom out" an operator selected area of a complex display screen to facilitate selection of a particular displayed object Again, rerasterization of objects in nonselected areas of the display screen ultimately comprises unnecessary processing. Thus, a genuine need clearly exists for a more efficient interactive raster graphics display system processing technique for identifying an operator selected displayed object to be operated on and for zooming out an operator choosen area of the display screen to facilitate picking of a displayed object.

SUMMARY OF THE INVENTION

Briefly, in a computer graphics display system having means for mapping data representative of geometric primitives in a first coordinate space to a second, planar coordinate space for display, this invention comprises an improved method for identifying displayed primitives that intersect an operator selected area of the second coordinate space. The method comprises the steps of: inverse mapping the second coordinate space selected area to first coordinate space; clipping the data list representative of displayed geometric primitives against the inverse mapped selected area; and selecting the clipped data representative of displayed geometric primitives that intersect the inverse mapped selected area in the first coordinate space.

In a further enhancement, the invention comprises a processing method for enlarging displayed primitives that intersect an operator selected area of the second coordinate space to facilitate operator selection of a particular displayed object. The method includes the steps of: inverse mapping the second coordinate space selected area to the first coordinate space; clipping the data list representative of displayed geometric primitives against the inverse mapped selected area in first coordinate space and discarding data outside the inverse mapped area; mapping the clipped data that intersects the inverse mapped selected area to a zoom viewport within the second coordinate space; and rasterizing the mapped data for display within the second coordinate space zoom viewport. The identification processing method outlined above can then be combined with this aspect of the invention to identify an operator selected displayed object within the zoom viewport.

Accordingly, a principal object of the present invention is to provide a graphics system identification processing method capable of efficiently and quickly evaluating displayed data to identify those geometric primitives that intersect an operator selected area of the display screen.

Another object of the present invention is to provide such an identification processing method wherein only primitives that intersect the operator selected area of the display screen are mapped to and rasterized in screen coordinate space.

Yet another object of the present invention is to provide an improved graphics system processing method capable of efficiently and quickly zooming out a selected area of the display screen to facilitate selection of a particular geometric object from a complex screen display.

Still another object of the present invention is to provide such a zoom processing method wherein only objects that intersect the operator selected area of the display screen are mapped to and rasterized in screen coordinate space.

BRIEF DESCRIPTION OF DRAWINGS

These and other objects, advantages and features of the present invention will be more readily understood from the following detailed description of one embodiment of the present invention, when considered in conjunction with the accompanying drawings in which.

DETAILED DESCRIPTION OF THE INVENTION

This invention comprises an improved interactive raster graphics display system processing method for identifying an operator selected displayed object which requires rerasterization of only a limited portion of the original display data, thus dramatically reducing processing time. Further, the invention comprises an analogous graphics system processing technique for zooming out or enlarging objects displayed in a limited portion of the monitor screen surrounding the center of a locating device, to facilitate operator selection of a particular displayed object when a complex display is presented. Only the contents of a "zoom window" defined in world coordinate space are rerasterized, again significantly reducing processing time over prior zoom techniques.

Figure 1:
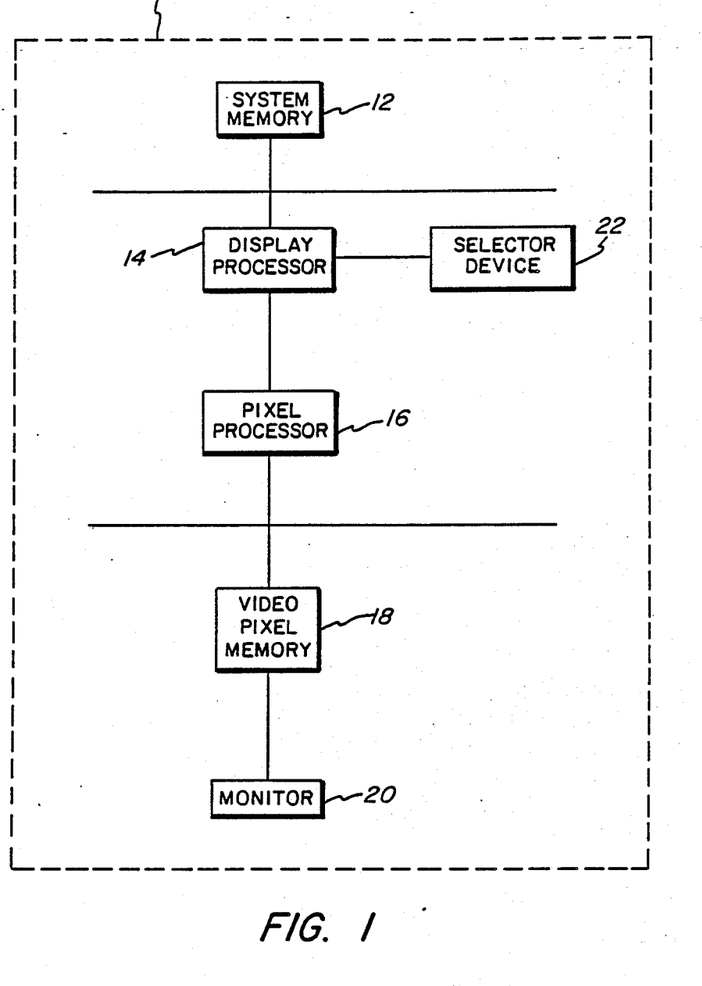
FIG. 1 is a general block diagram representation of an interactive computer graphics display system. incorporating the present invention.

Referring to FIG. 1, several major components of a raster graphics display system, generally denoted 10, are illustrated. System 10 includes system memory 12, display processor 14, pixel processor 16, video pixel memory 18, monitor 20 and selector device 22. Each of these components can be implemented by elements of commercially available computer graphics display systems such as the IBM 5080. Briefly described, display processor 14 is responsible for executing the display program residing within system memory 12 and functions principally to generate the image which will appear on display monitor 20. Display processor 14 performs the following functions: decoding graphics orders and executing nondrawing orders, e.g., bookkeeping and control; performing transformation and clipping functions to geometric primitives, such as lines, characters, polygons, etc.; preparing geometric objects or primitives for display by preprocessing and feeding data representative thereof to pixel processor 16 and video pixel memory 18; and if an operator selection or pick occurs, processing the selected data and sending it back to the application program. Pixel processor 16 includes a hardware implementation of the Bresenham Line Generation Algorithm, which takes the end points of a vector as input (i.e., x-axis and y-axis coordinates) and generates pixels in video pixel memory 18 as output for display on monitor 20. Textual treatment of the Bresenham Algorithm is provided by J.D. Foley and A. Van Dam, in *Fundamentals of Interactive Computer Graohics* at pp. 433-461 (1982). Processor 16 also contains hardware for pixel manipulation, such as logical operations, bit block transfer, etc. Video pixel memory 18 consists of eight 1k by 1k bit planes which support simultaneous display of up to 256 colors via color look-up tables. The image stored in video pixel memory 18 is displayed in monitor 20 for operator viewing. Selector device 22 is connected to processor 14 and allows direct operator interaction with system 10.

As noted initially, several types of selector devices are widely in use, such as locators, light pens, valuators, keyboards and buttons. Of these, locators comprise the vast majority of such devices, tablets being perhaps most common. A tablet is a flat surface over which a stylus (like a pencil) or hand cursor is moved. The position of the hand cursor or stylus is transferred to processor 14 of system 10. Most cursors also provide the operator with several function keys, such as the "pick" and zoom"functions to which the present invention is directed. Actuation of a function key directs the processor to begin the desired processing with reference to the current location of the selector device. Tablets are well known in the art and numerous versions are commercially available.

Figure 2:
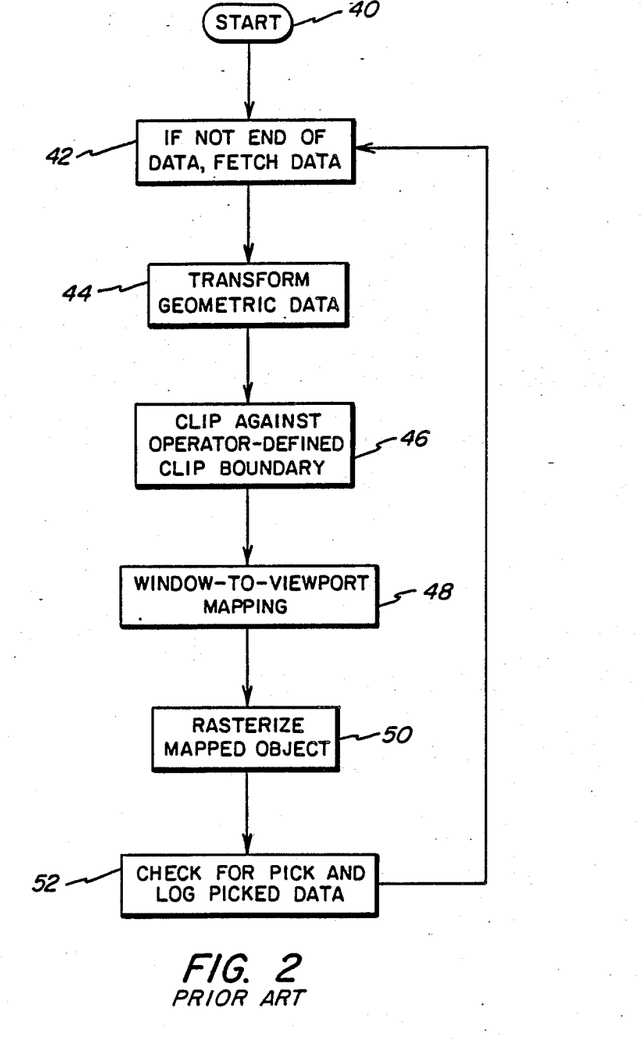
FIG. 2 is a flow diagram representation of existing graphics system processing used to identify an operator selected displayed. object.

As briefly discussed above, previous picking procedures have required the rerasterization of an entire screen display to identify a particular geometric object selected for application processing. This prior art procedure is illustrated in the flow diagram of FIG. 2. Actuation of the "pick" function key enables the pick correlation operation at 40 "Start", and processor 14 is directed to obtain for processing the next piece of data representative of a geometric primitive, "If 5 Not End Of Data, Fetch Data" 42. Processor 14 then transforms and clips the data in world coordinate space "Transform Geometric Data" 44, and "Clip Data Against Operator-Defined Clip Boundary" 46, respectively. (Transformation, clipping and mapping functions are described further below.) Clipping instruction 46 essentially directs the processor to remove those parts of a displayed object, or more particularly, one or more geometric primitives definitive thereof, not within a defined clipping volume (3D clipping) or area (2D clipping). After clipping, processor 14 is directed to map the clipped data to a predefined display viewport in screen coordinate space, "Window-to-Viewport Mapping" 48, and then to rasterize the mapped object, "Rasterize Mapped Object" 50 After rasterization, the display processor is directed to finally determine whether the pixels generated during rasterization intersect the operator defined pick window or area in screen coordinate space, "Check For Pick And Log Picked Data" 52 If an intersection is identified, a pick occurs and the display processor records the object for subsequent processing according to the application rules set by the operator.

Again, rasterization of mapped objects not subsequently selected results in a time consuming and unnecessary expenditure of processing time. Thus, the present invention comprises a processing technique whereby only those geometric objects intersecting the pick area in screen coordinate space are ultimately rasterized from world coordinate space to screen coordinate space. Before describing a detailed implementation of the processing technique, standard transformation, clipping and mapping functions carried out by graphics system 10 will be briefly reviewed.

With the present invention, each primitive geometrically oriented in a 3D or 2D world coordinate space (such as a vector, circle, curve or filled polygon) representative, in whole or in part, of a displayed object (in screen coordinate space) undergoes the traditional transformation and clipping functions in world coordinate space, and possibly mapping to screen coordinate space as described below. The first stage of processing data representative of a displayed primitive comprises transformation of the primitive in world coordinate space. Transformation may consist of a rotation, translation, scaling, shearing, or a combination of two or more of these functions, and is accomplished by matrix multiplication.

The second processing stage is clipping of the data against an operator defined clipping box (3D) or window (2D) in world coordinate space. Clipping discards that portion of a geometric primitive outside the box or window. The next stage is to map the clipped data to screen coordinate space, i.e., to a predefined viewport in the display screen. These processes are well known in the art and described in detail in the above cited Foley and Van Dam text. Because of its importance to describing the present invention, mapping will be examined in greater detail below.

Figure 3A:
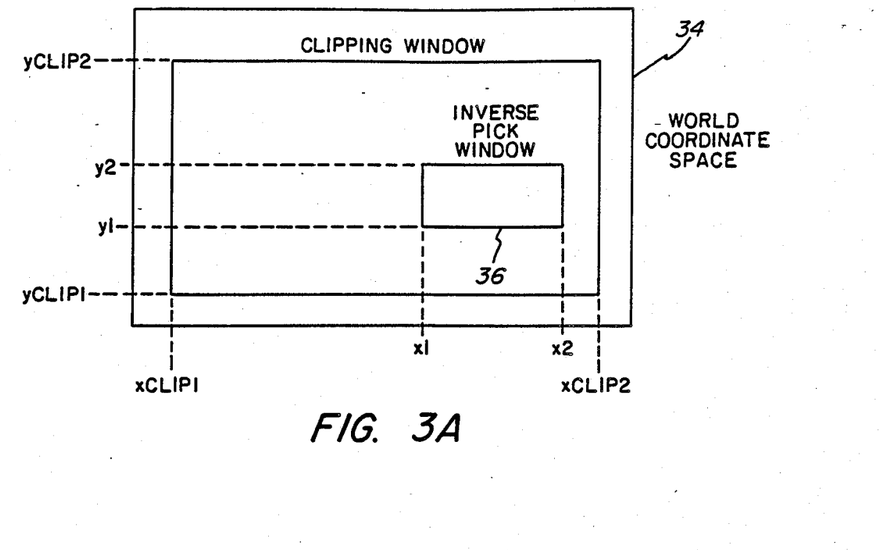
FIGS. 3A and 3B graphically illustrate certain areas defined in world coordinate space and screen coordinate space with implementation of the present invention.
Figure 3B:
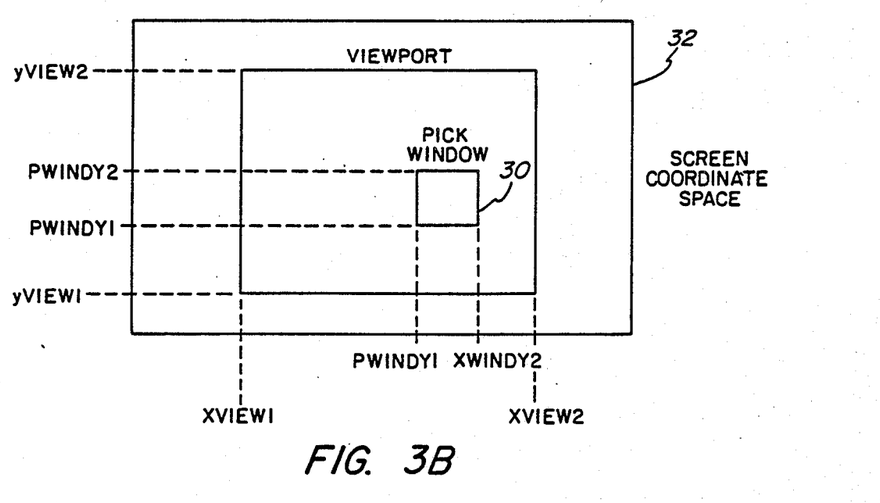

Referring to FIGS. 3A and 3B, the predefined boundaries of a clipping window 34 in world coordinate space are:

xclip1,xclip2 x-clipping boundary yclip1,yclip2 y-clipping boundary zclip1,zclip2 z-clipping boundary (not shown).

(Although not described, the processing techniques disclosed herein are equally applicable to three dimensional clipping and the appended claims are intended to encompass such.) The coordinates for the corresponding operator defined viewport 32 in screen coordinate space are:

| xview1,xview2 | x-viewport boundary |
|---|---|
| yview1,yview2 | y-viewport boundary |

Thus, it will be observed that x- and y-coordinate window-to-viewport ratios are expressed as:

$$wvx=(xview2-xview1)/(xclip2-xclip1) \quad (1)$$

$$wvy=(yview2-yview1)/(yclip2-yclip1)$$

Further, x- and y-coordinate window-to-viewport mapping equations are defined as:

$$xv=(xw-xclip1)*wvx+xview1 \quad (2)$$

$$yv=(yw-yclip1)*wvy+yview1$$

In equations (2), xw and yw comprise the x- and y-coordinates of data representative of a primitive within clipping window 34 in world coordinate space (FIG. 3A), and xv and yv comprise the corresponding mapped x- and y-coordinates of the primitive within viewport 32 in screen coordinate space (FIG. 3B). Wvx and wvy are defined by equations (1).

Central to the processing method of the present invention is the transformation or inverse mapping of an operator defined pick window 30 (FIG. 3B) from screen coordinate space to world coordinate space such that an inverse pick window 36 (FIG. 3A) is defined. The boundary of inverse pick window 36 is then used as the x-axis and y-axis clipping boundaries by processor 14 to initially identify in world coordinate space the operator selected geometric primitive(s) defining a displayed object, as will now be described with reference to FIG. 4.

Upon entering the selection processing mode of the present invention at 60 "Start", for example in response to operator actuation of a function key, the processor is directed to calculate the inverse pick window boundary 36 (FIG. 3A), "Calculate Inverse Pick Window Boundary" 62. The size of the pick window (in screen coordinates), psizex and psizey, is preconfigured by the operator. The center, pickx and picky, of the pick window in screen coordinate space is defined by the position of the operator controlled selectors device 22. As shown in FIG. 3B, pick or match window 30 in screen coordinate space is defined by four boundaries:

$$pwindx1=pickx-psizex/2$$

$$pwindx2=pickx+psizex/2 \quad (3)$$

$$pwindy1=picky-psizey/2$$

$$pwindy2=picky+psizey/2$$

Applying inverse window-to-viewport mapping to pick window 30 results in inverse pick window 36 in world coordinate space with the following parameters:

$$x1=(pwindx1-xview1)*xratio+xclip1$$

$$x2=(pwindx2-xview1)*xratio+xclip1 \quad (4)$$

$$y1=(pwindy1-yview1)*yratio+yclip1$$

$$y2=(pwindy2-yview1)*yratio+yclip1$$

wherein:

$$xratio=1/wvx$$

$$yratio=1/wvy$$

Window-to-Viewport ratios wvx and wvy are defined by equations (1) above. An inverse pick box (not shown) in 3D world coordinate space could alternatively be defined if desired, by using the preexisting z-axis clipping boundaries, i.e., zclip1 and zclip2, in combination with the inverse pick window parameters defined by equations (4).

Figure 4:
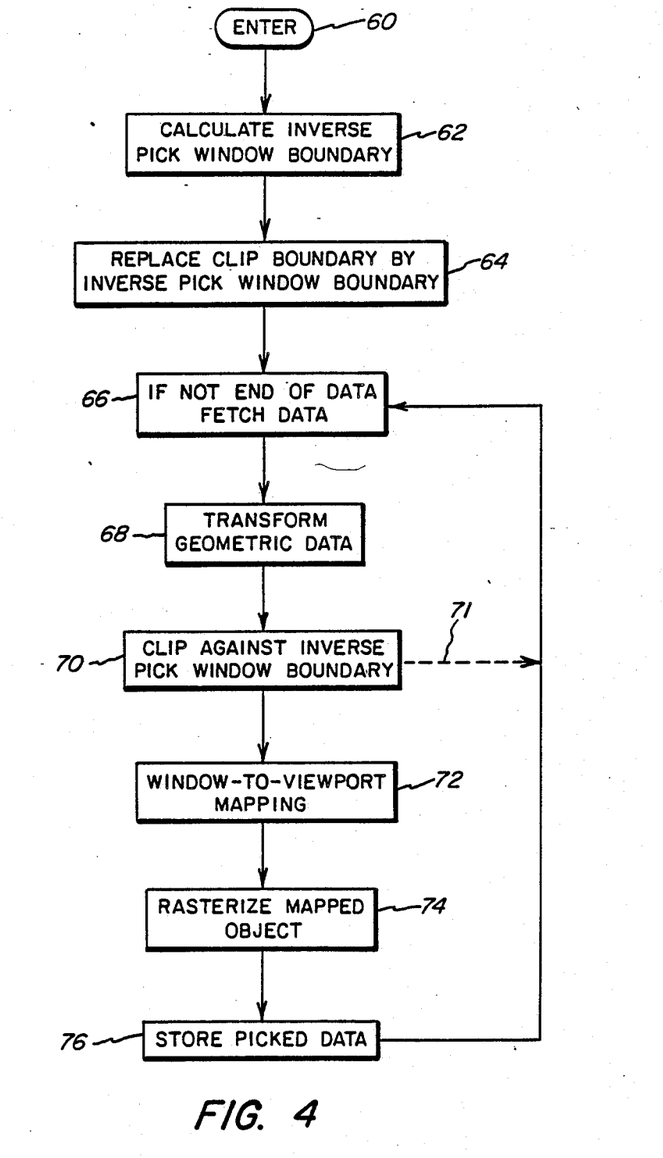
FIG. 4 is a flow diagram representation of the selection processing method of the present invention.

After calculating the inverse pick window boundary, processor 14 is directed to replace the previously defined clipping window boundary 34 by the inverse pick window boundary 36, "Replace Clip Boundary By Inverse Pick Window Boundary" 64. Subsequently, the processor enters the main pick correlation processing loop at instruction 66 "If Not End Of Data, Fetch Data", where the processor is directed to obtain the next piece of data from the data list representative of displayed objects for performance of transformation and clipping, and possibly mapping and rasterization, operations thereon. Specifically, the processor transforms each piece of data "Transform Geometric Data" 68, and then clips it against the inverse pick window boundary 36, "Clip Against Inverse Pick Window Boundary" 70.

Preferably, trivial rejection clipping is utilized to further limit the processing time required for complex geometric primitives such as circles, ellipses, and filled area polygons. Curved objects, such as circles and ellipses, are typically represented by a plurality of line segments generated directly from an appropriate curve parametric equation. These line segments are then individually transformed, clipped, and mapped, a process which is very time consuming, and unnecessary if the transformed curved figure lies entirely outside the inverse pick window boundary. Thus, a trivial clip or extent test, which essentially generates a box around the primitive and determines whether the box intersects the clipping window, is preferably utilized to determine whether a primitive lies entirely outside the inverse pick window boundary. If outside, no additional processing is required and the processor returns via 71 to instruction 66, thereby avoiding mapping and rasterization of a nonselected primitive. In the case of filled area polygons, the filling time is also saved where the primitive is trivially rejected as being outside the inverse pick window boundary. Trivial rejection processing is well known by those skilled in the art.

If intersecting inverse pick window 36, the clipped data is mapped to the viewport in screen coordinate space "Window-To-Viewport Mapping" 72, and then rasterized, via pixel processor 16, Rasterize Mapped Object "74. The picking or selection of an object occurs during the rasterization step 74 when the generated pixels of an object are compared to the pick window. Some graphics processors have the ability to identify picked objects prior to mapping and rasterization. In such a device steps 72 and 74 may be omitted with processing proceeding directly from step 70 to step 76. Lastly, the processor stores the picked data "Store Picked Data" 76 and processes the data according to the rules set by the application program. Again, note that this processing technique eliminates the rasterization and examination of any geometric primitive not intersecting the inverse pick window, and therefore the pick window, thereby significantly reducing pick correlation time, especially when there are a number of complex primitives such as filled polygons or widened lines on the display screen.

As a further enhancement of the invention, an efficient zoom processing technique is provided. A "zoom" function is often available in graphics systems to facilitate operator selection of a geometric primitive in an area of a complex display screen crowded with many displayed objects. As with the described pick window processing, only the contents of a zoom window are rasterized pursuant to this invention, thus significantly reducing processing time in comparison with prior zoom processing techniques, which again typically require rerasterization of the entire display screen.

Figure 5:
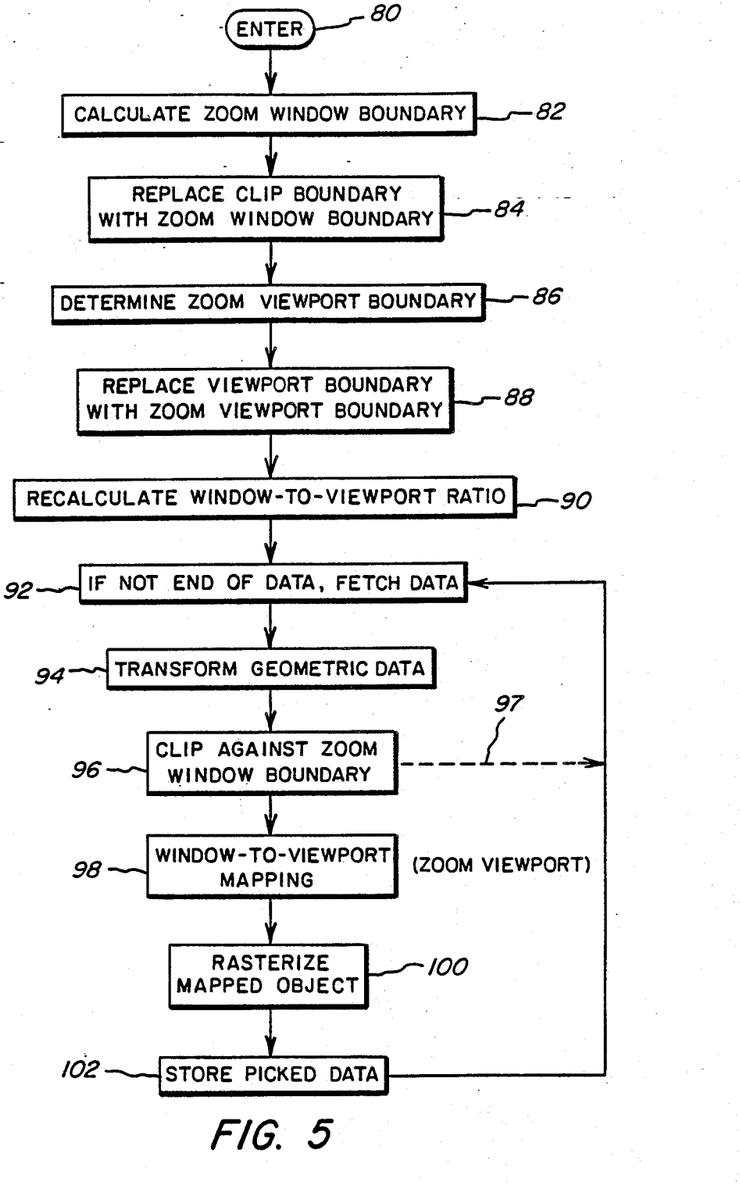
FIG. 5 is a flow diagram representation of the corresponding zoom processing technique of the present invention.
Figure 6A:
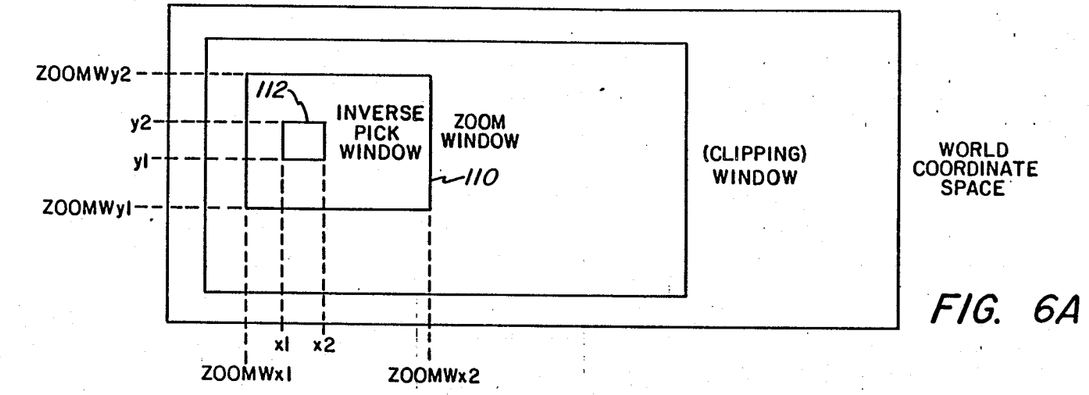
FIGS. 6A and 6B graphically illustrate certain areas defined in world coordinate space and screen coordinate space with implementation of the method of the FIG. 5.

Referring to FIG. 5, when an operator selects the zoom mode, the processor begins at 80 "Start" and then proceeds to determine the zoom window boundary "Calculate Zoom Window Boundary" 82. As shown in FIG. 6A, zoom window 110 is defined in world coordinate space as a rectangle which contains an inverse pick window 112. The size of zoom window 110 is selected by the operator or predefined by the system. For purposes of explanation, it is assumed that the zoom window is sixteen times as large as inverse pick window 112. As described before with reference to FIGS. 3A and 3B, the pick window 114 size in screen coordinate space is defined to be psizex and psizey, and its center, pickx and picky, in screen coordinate space is determined by the position of the operator controlled locator device. As before, applying inverse window-to-viewport mapping to pick window 114 (i.e. equations (3) and (4) above), values for parameters x1, x2, y1 and y2 (see FIG. 6A) definitive of inverse pick window 112 in world coordinate space are obtained.

Zoom window 110 is similarly determined by applying inverse window-to-viewport mapping (equations (4) above) to a rectangle in screen coordinate space (note shown) defined by:

$$pwtwox1 = pickx - 2psizex$$
$$pwtwox2 = pickx + 2psizex \quad (5)$$
$$pwtwox1 = picky - 2psizey$$
$$pwtwox2 = picky + 2psizey$$

Again, for purposes of explanation, the zoom window in world coordinate space is arbitrarily defined herein to be sixteen times as large as the inverse pick window. The illustrated boundaries of zoom window 110 have values expressed by:

$$zoomwx1 = (pwtwox1 - xview1)*xratio + xclip1$$
$$zoomwx2 = (pwtwox2 - xview1)*xratio + xclip1 \quad (6)$$
$$zoomwy1 = (pwtwoy1 - yview1)*yratio + yclip1$$
$$zoomwy2 = (pwtwoy2 - yview1)*yratio + yclip1$$

Wherein:

$$xratio = 1/wvx$$
$$yratio = 1/wvy$$

Figure 6B:
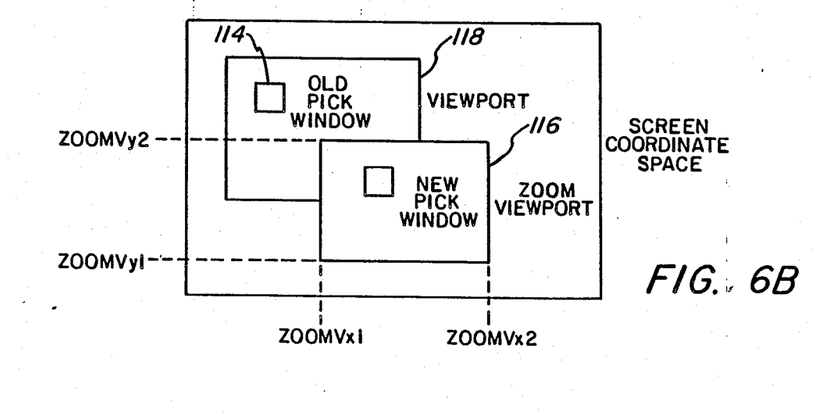

Window-to-Viewport mapping wvx, wvy, ratios are defined by equations (1). Xview1 and yview1 are the x-axis and y-axis minimum boundaries, respectively, of viewport 118 in screen coordinate space, and xclip1 and yclip1 are the x-axis and y-axis minimum boundaries, respectively, of the predefined clipping window in world coordinate space.

Continuing with FIG. 5, after calculating the zoom window boundary, the processor is directed to replace the preexisting clipping boundary in world coordinate space with the zoom window boundary, "Replace Clip Boundary With Zoom Window Boundary" 84, and then to obtain the zoom viewport boundary, "Determine Zoom Viewport Boundary" 86. The zoom viewport 116 is a rectangular area in screen coordinate space of any size defined, i.e. preconfigured, by the operator. As shown in FIG. 6B, viewport 116 is expressed by parameters zoomvx1, zoomvx2, zoomvy1, and zoomvy2. If desired, the zoom viewport can overlay the original data on the screen, similar to a pop-up window.

The processor next replaces the original viewport boundary 118 (FIG. 6B) with the zoom viewport boundary 116, "Replace Viewport Boundary With Zoom Viewport Boundary" 88, and then calculates the new window-to-viewport ratio, "Recalculate Window-To-Viewport Ratio" 90. Recalculation of the window-to-viewport ratio is necessary because, as noted, zoom viewport 116 is operator defined and possibly different in size from original viewport 118. Next, the processor enters the main processing loop at 92 "If Not End Of Data, Fetch Data", where processor 14 begins to work through the data list representative of displayed geometric primitives. Again, each piece of data representative of a geometric primitive is transformed "Transform Geometric Data" 94, and clipped against the new clipping boundary, i.e., the zoom window boundary 110 (FIG. 6A), "Clip Against Zoom Window Boundary" 96. As before, those primitives outside the clipping boundary, i.e. the zoom window boundary, are discarded and the processor returns to instruction 92 via line 97. Preferably, trivial clip testing is also utilized as described above to enhance processing time. Next, the processor is directed to map the retained clipped data to zoom viewport 116 in screen coordinate space using the recalculated window-to-viewport ratio, "Window-To-Viewport Mapping" 98, and then to rasterize the mapped object, "Rasterize Mapped Object" 100. Thereafter, the processor stores the object for display on the screen within the zoom viewport, "Store Picked Data" 102. The operator can then use the locator device to initiate a select or pick operation from the geometric objects within the zoom viewport, which will be processed in the same manner as described with reference to FIG. 4.

It will be observed from the above that this invention fully meets the objectives set forth herein. An interactive computer graphics display system processing method for identifying a displayed object which intersects an operator selected area of the display screen in a more efficient manner than heretofore known processing techniques is described. In addition, a zoom function processing method is described for enlarging an operator selected area of the display screen in a more efficient manner than heretofore known processing techniques is provided.

Although specific embodiments of the selection identification processing method and the zoom processing method of the present invention have been illustrated in the accompanying drawings and described in the foregoing detailed description, it will be understood that the invention is not limited to the particular embodiments described herein but is capable of numerous rearrangements, modifications and substitutions without departing from the scope of the invention. The following claims are intended to encompass all such modifications.

What is claimed is:

1. In a computer graphics display system having means for mapping data representative of geometric primitives in a first coordinate space to a second, planar coordinate space for display, a method for identifying primitives which intersect a selected area of the second coordinate space, said method comprising the steps of:
   entering a selection processing mode;
   inverse mapping a selected area of said second coordinate space to said first coordinate space;
   clipping said geometric primitive data against said inverse mapped selected area in said first coordinate space to produce clipped data;
   selecting said clipped data representative of said geometric primitives which at least partially intersect said inverse mapped selected area; and
   storing pick data for each geometric primitive represented by said selected clipped data wherein said pick data identifies particular primitives lying at least partially within said selected area.

2. The method of claim 1 wherein said clipping step includes discarding said clipped data representative of said geometric primitives lying completely outside said inverse mapped selected.

3. The method of claim 1, wherein said selecting step further comprises mapping said selected clipped data to said second coordinate space and rasterizing said mapped selected data for operator viewable display in said second coordinate space.

4. In a computer graphics display system having a first-coordinate space containing data representative of geometric primitives and a second, planar coordinate space wherein graphic objects are displayed, each of said objects being defined by at least one of said geometric primitives, a processing method for identifying said geometric primitives which intersect a selected area of the second coordinate space, said processing method comprising the steps of:
   (a) entering a selection processing mode;
   (b) inverse mapping of said second coordinate space selected area to said first coordinate space;
   (c) transforming said data representative of one of said geometric primitives within said first coordinate space;
   (d) clipping said transformed data against said inverse mapped selected area in said first coordinate space to produce clipped data;
   (e) selecting said clipped data representative of said geometric primitives which at least partially intersect said inverse mapped selected data;
   (f) discarding said clipped data lying completely outside said inverse mapped selected area;
   (g) mapping said selected clipped data to said second coordinate space;
   (h) rasterizing said mapped selected clipped data;
   (i) storing pick data for said geometric primitive represented by said rasterized mapped selected clipped data wherein said pick data identifies particular primitives lying at least partially within said selected area; and
   (j) repeating steps (c) - (i) for all data representative of geometric primitives in said first coordinate space.

5. The method of claim 4, wherein said inverse mapping step (b) includes calculating boundaries in said first coordinate space corresponding to boundaries of said selected area in said second coordinate space.

6. The method of claim 5, wherein calculating said corresponding boundaries in said first coordinate space includes applying the following formulas:

$$x1 = (pwindx1 - xview1) * xratio + xclip1$$

$$x2 = (pwindx2 - xview1) * xratio + xclip1$$

$$y1 = (pwindy1 - yview1) * yratio + yclip1$$

$$y2 = (pwindy2 - yview1) * yratio + yclip1$$

wherein:
   x1 = x-axis minimum boundary of the inverse mapped selected area in first coordinate space
   x2 = x-axis maximum boundary of the inverse mapped selected area in first coordinate space
   y1 = y-axis minimum boundary of the inverse mapped selected area in first coordinate space
   y2 = y-axis maximum boundary of the inverse mapped selected area in first coordinate space
   pwindx1 = x-axis minimum boundary of the selected area in second coordinate space
   pwindx2 = x-axis maximum boundary of the selected area in second coordinate space
   pwindy1 = y-axis minimum boundary of the selected area in second coordinate space
   pwindy2 = y-axis maximum boundary of the selected area in second coordinate space
   xview1 = x-axis minimum boundary of the predefined viewpoint in second coordinate space
   xview2 = x-axis maximum boundary of the predefined viewpoint in second coordinate space yview1 = x-axis minimum boundary of the predefined viewpoint in second coordinate space
yview2 = x-axis maximum boundary of the predefined viewpoint in second coordinate space
xratio = inverse of the x-axis first coordinate space to second coordinate mapping ratio, said xratio being:

$$\frac{(xclip2 - xclip1)}{(xview2 - xview1)}$$

yratio = inverse of the y-axis first coordinate space to second coordinate space mapping ratio, said yratio being:

$$\frac{(yclip2 - yclip1)}{(yview2 - yview1)}$$

xclip1 = x-axis minimum boundary of the predefined clipping area in first coordinate space
xclip2 = x-axis maximum boundary of the predefined clipping area in first coordinate space
yclip1 = y-axis minimum boundary of the predefined clipping area in first coordinate space
yclip2 = y-axis maximum boundary of the predefined clipping area in first coordinate space.

7. In a computer graphics display system having means for clipping data representative of geometric primitives in a first coordinate space against a predefined boundary and means for mapping clipped data from the first coordinate space to a second, planar coordinate space for display, a processing method for enlarging said geometric primitives which intersect a selected area of the second coordinate space, said method comprising the steps of:

(a) entering a zoom processing mode;

(b) inverse mapping of said second coordinate space selected area to a zoom window in said first coordinate space;

(c) clipping said data representative of one of said geometric primitives against said zoom window in said first coordinate space to produce clipped data;

(d) selecting said clipped data which intersects said ivnerse mapped selected data;

(e) discarding said clipped data which lies outside said zoom window;

(f) mapping said selected clipped data to a zoom viewport within said second coordinate space; and (g) rasterizing said mapped selected clipped data for display within said second coordinate space zoom viewport.

8. The method of claim 8, further comprising the step of repeating steps (c) - (g) for all data representative of said geometric primitives in said first coordinate space.

9. The method of claim 8, further comprising the step of transforming said obtain data within first coordinate space prior to said clipping step (c).

10. The method of claim 8, further comprising the step of substituting said zoom window for said predefined clipping boundary within said first coordinate space prior to said clipping step (c).

11. The method of claim 8, further comprising an identifying step wherein said geometric primitives which intersect a selected area of said second coordinate space zoom viewport are identified, said identifying step comprising:

entering a zoom-section processing mode;

inverse mapping said second coordinate space zoom viewport selected area to said first coordinate space;

clipping said geometric primitive data against said ivnerse mapped zoom viewport selected area in said first coordinate space to produce clipped data;

selecting said clipped data representative of said geometric primitives which at least partially intersect said inverse mapped zoom viewport selected area; and storing pick data for each geometric primitive represented by said selected clipped data wherein said pick data identifies particular primitives lying at least partially within said selected area.

* * * * *